(12) United States Patent
Suzuki

(10) Patent No.: US 12,184,214 B2
(45) Date of Patent: Dec. 31, 2024

(54) MOTOR CONTROL DEVICE

(71) Applicant: DENSO CORPORATION, Kariya (JP)

(72) Inventor: Ryo Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 181 days.

(21) Appl. No.: 18/153,442

(22) Filed: Jan. 12, 2023

(65) Prior Publication Data
US 2023/0261603 A1 Aug. 17, 2023

(30) Foreign Application Priority Data

Feb. 16, 2022 (JP) ................ 2022-022150

(51) Int. Cl.
H02P 27/08 (2006.01)
H02M 7/537 (2006.01)
H02P 6/08 (2016.01)

(52) U.S. Cl.
CPC ............ *H02P 27/08* (2013.01); *H02M 7/537* (2013.01); *H02P 6/08* (2013.01)

(58) Field of Classification Search
CPC .. H02P 27/08; H02P 6/08; H02P 9/305; H02P 27/047; H02M 7/537
See application file for complete search history.

(56) References Cited

U.S. PATENT DOCUMENTS

| 4,723,201 | A | | 2/1988 | Tanamachi et al. |
| 5,506,484 | A | * | 4/1996 | Munro ................. B60L 3/0069 318/599 |
| 6,483,270 | B1 | * | 11/2002 | Miyazaki ............... H02P 6/182 318/705 |
| 2014/0359179 | A1 | | 12/2014 | Aue et al. |

FOREIGN PATENT DOCUMENTS

| JP | H11-285288 A | | 10/1999 |
| JP | 2000341989 A | * | 12/2000 |
| JP | 2012-223011 A | | 11/2012 |
| JP | 5470296 B2 | * | 4/2014 |
| JP | 5862125 B2 | * | 2/2016 |
| JP | 2017-93029 A | | 5/2017 |
| JP | 2021-69138 A | | 4/2021 |

* cited by examiner

*Primary Examiner* — Jorge L Carrasquillo
(74) *Attorney, Agent, or Firm* — Posz Law Group, PLC

(57) ABSTRACT

A motor control device includes a timer circuit, a control mode setting unit, a PWM control unit, an angle calculation unit, and an angle synchronization control unit. The PWM control unit switches the operation mode of the angle synchronization control unit according to the control mode set by the control mode setting unit, and executes the PWM control when the operation mode of the angle synchronization control unit is the PWM mode. The angle synchronization control unit executes the angle synchronization control when the operation mode is the angle synchronization mode.

4 Claims, 11 Drawing Sheets

MOTOR CONTROL DEVICE

CROSS REFERENCE TO RELATED APPLICATIONS

The present application claims the benefit of priority from Japanese Patent Application No. 2022-022150 filed on Feb. 16, 2022. The entire disclosure of the above application is incorporated herein by reference.

TECHNICAL FIELD

The present disclosure relates to a motor control device that operates an inverter to drive a motor.

BACKGROUND

According to a conceivable technique, a control device is configured to switch the control method of an inverter between PWM control and angle synchronous control according to the modulation rate of an output voltage vector for driving a motor with a command torque. PWM is an abbreviation for Pulse Width Modulation.

This control device is provided with two modulation units for generating drive signals for a plurality of switching elements that form an inverter according to each control method. One of the drive signals generated by each modulation unit is selectively input to the inverter via a selector.

SUMMARY

According to an example, a motor control device may include a timer circuit, a control mode setting unit, a PWM control unit, an angle calculation unit, and an angle synchronization control unit. The PWM control unit switches the operation mode of the angle synchronization control unit according to the control mode set by the control mode setting unit, and executes the PWM control when the operation mode of the angle synchronization control unit is the PWM mode. The angle synchronization control unit executes the angle synchronization control when the operation mode is the angle synchronization mode.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
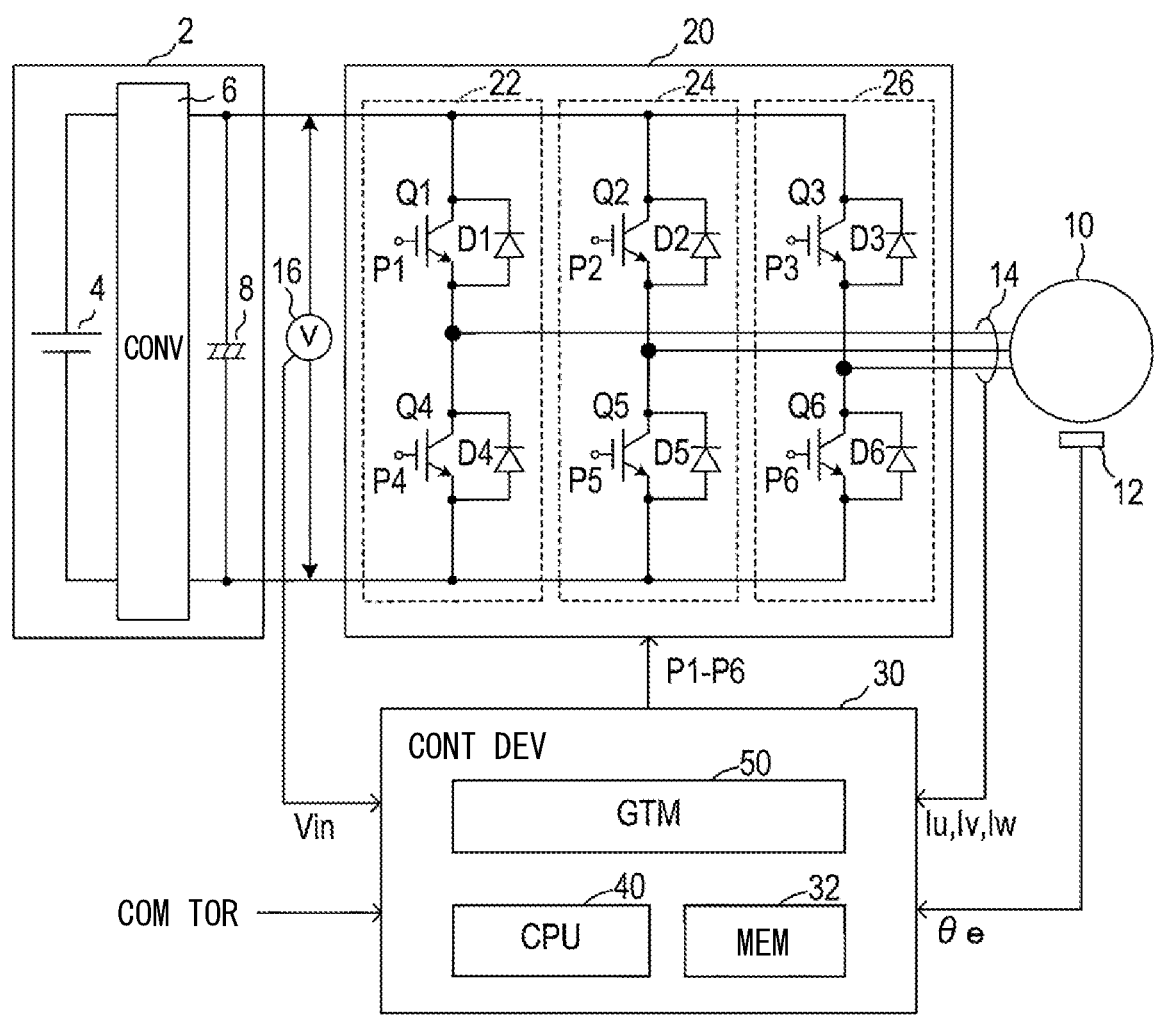
FIG. 1 is a diagram showing the overall configuration of a motor control system according to an embodiment.

In the control device according to the conceivable technique, in order for the two modulation units to output drive signals for turning on and off the plurality of switching elements of the inverter according to each control method, it is necessary to provide a timer circuit for detecting rise and fall timings of the drive signals in each modulation unit. Specifically, the modulation unit for PWM control needs to be provided with a timer circuit having a counter for time keeping so that the drive signal can be output at desired timing. Further, the modulation unit for angle synchronous control needs to be provided with an angle timer having a counter for counting the rotation angle of the motor so that a drive signal can be output at a desired rotation angle of the motor.

The control device usually includes a microcomputer capable of executing various kinds of arithmetic processing, but a general-purpose microcomputer is not equipped with an angle timer. Therefore, a dedicated microcomputer with an angle timer is required to implement the above control device. However, if the motor control device is configured by a dedicated microcomputer equipped with an angle timer, the configuration of the device may become complicated and the cost may increase.

One aspect of the present embodiments provides a motor control device that drives a motor by switching the control method of an inverter between PWM control and angle synchronous control, without using a microcomputer equipped with an angle timer, at low cost.

A motor control device according to one aspect of the present embodiments is a motor control device that drives a motor by operating an inverter that includes a plurality of switching elements for connecting a positive and a negative electrode of a DC power supply and a plurality of terminals of a motor. The motor control device includes a timer circuit, a control mode setting unit, a PWM control unit, an angle calculation unit, and an angle synchronization control unit.

The timer circuit includes a plurality of compare registers that store the on/off timing of each switching element for each pair of positive side and negative side switching elements in the inverter connected to a plurality of terminals of the motor.

Also, the timer circuit includes a counter for time keeping. The timer circuit is configured to output a signal indicating the on and off timing of each switching element when the value of each compare register and the value of the counter match.

The control mode setting unit is configured to set the control mode of the motor to either the PWM mode or the angle synchronous mode based on the command torque input from the outside. Note that the PWM mode is a control mode in which each switching element of the inverter is turned on/off at predetermined timings at regular intervals. Also, the angle synchronous mode is a control mode in which each switching element is turned on/off according to the rotation angle of the motor.

When the control mode set by the control mode setting unit is the PWM mode, the PWM control unit executes the PWM control, for calculating the on/off timing to be set in each compare register in order to drive the motor with the command torque, and outputting it to the timer circuit, at regular time intervals.

The angle calculator calculates the on/off timing of each switching element for driving the motor with the command torque as the rotation angle of the motor for each predetermined rotation angle of the motor.

The angle synchronization control unit executes angle synchronous control by writing on/off timings to each compare register so that each switching element is turned on/off at the rotation angle calculated by the angle calculation unit.

Therefore, the timer circuit outputs a signal for turning on/off the plurality of switching elements of the inverter according to the on/off timing calculated by the PWM control unit or the on/off timing calculated by the angle calculation unit.

Here, when the PWM control unit and the angle synchronization control unit directly write the ON/OFF timing for PWM control or angle synchronous control to the compare register of the timer circuit, each control may interfere with each other when switching the control mode.

For example, when the control mode is switched, the on/off timing set in the compare register of the timer circuit for control after switching may be overwritten with the on/off timing for control before switching. In this case, the control of the motor may become unstable, an overcurrent may flows through the motor, and a large torque fluctuation may occur in the motor.

Therefore, in the motor control device of the present disclosure, the timer circuit, the angle synchronization control unit, and the PWM control unit are configured as follows so that each control does not interfere with each other when switching control modes.

That is, the timer circuit includes a plurality of data registers storing a plurality of ON/OFF timings output from the PWM control unit to each compare register. Then, the timer circuit writes the on/off timings stored in the plurality of data registers into each compare register at regular time intervals.

Next, when the first operation mode, which is the operation mode of the angle synchronization control unit, is the PWM mode, the angle synchronization control unit receives the first switching command, and then the motor reaches a predetermined rotation angle position, the first operation mode is switched to the angle synchronization mode, and the angle synchronization control unit starts executing an angle synchronization control.

In the angle synchronization control, the on/off timing of each switching element is controlled according to the rotation angle of the motor. Thus, it is necessary to start the angle synchronization control at the predetermined rotation angle position of the motor in order to execute the angle synchronization control with high accuracy.

Further, when the first operation mode, which is the operation mode of the angle synchronization control unit, is the angle synchronization mode, and upon receiving the second switching command, the angle synchronization control unit switches the first operation mode to the PWM mode to stop the angle synchronization control.

On the other hand, when the control mode acquired from the control mode setting unit is the angle synchronization mode, the PWM control unit outputs a first switching command to the angle synchronization control unit so that the PWM control unit continues executing the PWM control until the first operation mode of the angle synchronization control unit is switched from the PWM mode to the angle synchronization mode.

Further, when the control mode acquired from the control mode setting unit is the PWM mode and the first operation mode of the angle synchronization control unit is the angle synchronization mode, the PWM control unit outputs a second switching command to the angle synchronization control unit to switch the first operation mode of the angle synchronization control unit to the PWM mode immediately before starting the next PWM control after a certain period of time.

That is, the PWM control unit outputs the first switching command and the second switching command to the angle synchronization control unit according to the control mode set by the control mode setting unit, so that the start and the stop of the angle synchronization control by the angle synchronization control unit are controlled. Therefore, the PWM control unit can execute the PWM control so as not to overlap with the execution period of angle synchronization control by the angle synchronization control unit.

Therefore, according to the motor control device of the present disclosure, under the control of the PWM control unit, the execution period of each control can be arbitrated so that the angle synchronization control and the PWM control do not interfere with each other when switching the control mode.

Further, when the angle synchronization control unit sets the first operation mode to the angle synchronization mode in accordance with the first switching command output from the PWM control unit, the angle synchronization control unit writes the specified value, which does not match the counter value, into the data register of the timer circuit, and then starts executing the angle synchronization control.

This is because when the first operation mode of the angle synchronization control unit is switched to the angle synchronization mode and the angle synchronization control unit starts the angle synchronization control, the data register of the timer circuit may hold the on/off timing set by the PWM control unit.

In other words, in this case, the value of the compare register is rewritten to the value of the data register at rewriting timings at regular intervals, and the switching elements in the inverter may be turned on/off at the rewritten on/off timings.

Therefore, when the angle synchronization control unit sets the first operation mode to the angle synchronization mode according to the first switching command, by writing the above specified value in the data register, the switching element in the inverter is restricted from turning on or off at the on/off timing of the PWM control.

Thus, according to the motor control device of the present disclosure, by switching the operation mode of the angle synchronization control unit using the PWM control unit, and by writing the specific value to the data register using the angle synchronization control unit, the interference between the angle synchronization control and the PWM control can be suppressed. Therefore, it is possible to prevent the motor control from becoming unstable due to interference between the angle synchronization control and the PWM control, resulting in an overcurrent flowing to the motor and a large torque fluctuation occurring in the motor.

Embodiments of the present disclosure will be described below with reference to the drawings.

[Embodiments]
[Configuration]

The motor control system of the present embodiment is a control system that is mounted on a vehicle (for example, an electric vehicle or a hybrid vehicle) having a motor 10 as an in-vehicle main machine and controls the motor 10.

As shown in FIG. 1, the motor control system includes a DC power supply 2, a motor 10, an inverter 20, and a control device 30. Note that the control device 30 corresponds to the motor control device of the present embodiments.

The motor 10 is a three-phase AC motor generator, and is a driving power source for the vehicle. Therefore, the motor 10 has a function of a motor that generates torque for driving the drive wheels of the vehicle and a function of a generator that is driven by the kinetic energy of the vehicle to generate electricity.

The DC power supply 2 includes a battery 4, a converter 6 that boosts the DC voltage supplied from the battery 4, and a capacitor 8 for power storage. The capacitor 8 is charged with the DC power input from the battery 4 via the converter 6 or with the generated power from the motor 10, and is discharged when the motor 10 is driven.

The inverter 20 is a three-phase power converter connected between the DC power supply 2 and the motor 10. The inverter 20 converts the DC power supplied from the DC power supply 2 into AC power and supplies the AC power to the motor 10. The inverter 20 also converts the AC power generated by motor 10 into DC power and supplies the DC power to DC power supply 2.

The inverter 20 includes switching elements Q1-Q6 and diodes D1-D6. The switching elements Q1 to Q6 include voltage-controlled semiconductor switching elements, specifically, insulated gate bipolar transistors (i.e., IGBTs). The switching elements Q1 to Q6 may include metal oxide semiconductor (i.e., MOS) transistors, bipolar transistors, or the like.

The switching elements Q1 to Q3 are connected between the U-phase terminal, the V-phase terminal, and the W-phase terminal of the motor 10 and the positive terminal of the DC power supply 2, respectively. The switching elements Q4 to Q6 are connected between the U-phase terminal, the V-phase terminal, and the W-phase terminal of the motor 10 and the negative terminal of the DC power supply 2, respectively.

Therefore, the switching elements Q1-Q3 function as upper arm switches for each phase of the motor 10, and the switching elements Q4-Q6 function as lower arm switches for each phase of the motor 10.

The diodes D1-D6 are connected in parallel to switching elements Q1-Q6, respectively. The diodes D1-D6 function as freewheel diodes that allow current to flow in the opposite direction to the current that flows when the switching elements Q1-Q6 turn on.

Therefore, the switching elements Q1 and Q4 and the diodes D1 and D4 function as an energization circuit 22 that bidirectionally flows a current to the U-phase terminal of the motor 10. The switching elements Q2 and Q5 and the diodes D2 and D5 function as an energization circuit 24 that bidirectionally flows a current to the V-phase terminal of the motor 10. The switching elements Q3 and Q6 and the diodes D3 and D6 function as an energization circuit 26 that bidirectionally flows a current to the W-phase terminal of the motor 10.

Next, the motor control system of this embodiment is provided with a rotation sensor 12, a current sensor 14, and a voltage sensor 16 as sensors for state detection.

The rotation sensor 12 is provided near a rotor (not shown) of the motor 10, detects a rotation angle θe of the rotor, and outputs the detected rotation angle θe to the control device 30. Note that the rotation angle θe is an electrical angle. A sensor such as a resolver or an encoder can be used as the rotation sensor 12.

The current sensor 14 detects a current flowing through each phase winding of motor 10 and outputs detected current values Iu, Iv, and Iw to control device 30. It should be noted that the current sensor 14 may simply detect the current values flowing through the two-phase windings of the motor 10. In this case, the current value of the remaining one phase is calculated using Kirchhoff's law.

The voltage sensor 16 detects an input voltage from the DC power supply 2 to the inverter 20 as power supply voltage Vin and outputs it to control device 30.

The control device 30 mainly includes a microcomputer having a CPU 40, a memory 32, and a GTM 50, and operates the inverter 20 to feedback-control the output torque of the motor 10 to the command torque. Note that GTM is a generic timer module.

Specifically, the control device 30 generates drive signals P1 to P6 for the switching elements Q1 to Q6 based on the values detected by the sensors, in order to turn on/off the switching elements Q1 to Q6 that provide the inverter 20, and output the signals to the inverter 20.

Here, the drive signals P1, P2 and P3 on the upper arm side of each phase of the motor 10 and the corresponding drive signals P4, P5 and P6 on the lower arm side are complementary pulse signals. Therefore, the U-phase switching elements Q1 and Q4, the V-phase switching elements Q2 and Q5, and the W-phase switching elements Q3 and Q6 are alternately turned on.

Note that the command torque is output from a control apparatus for vehicle control that is a higher level device than the control device 30. This higher level control apparatus obtains a target torque according to the driving state of the vehicle based on, for example, an accelerator signal from an accelerator sensor, a brake signal from a brake switch, a shift signal from a shift switch, and the like, and outputs this target torque as a command torque.

[Functions of Control Device and GTM]

Figure 2:
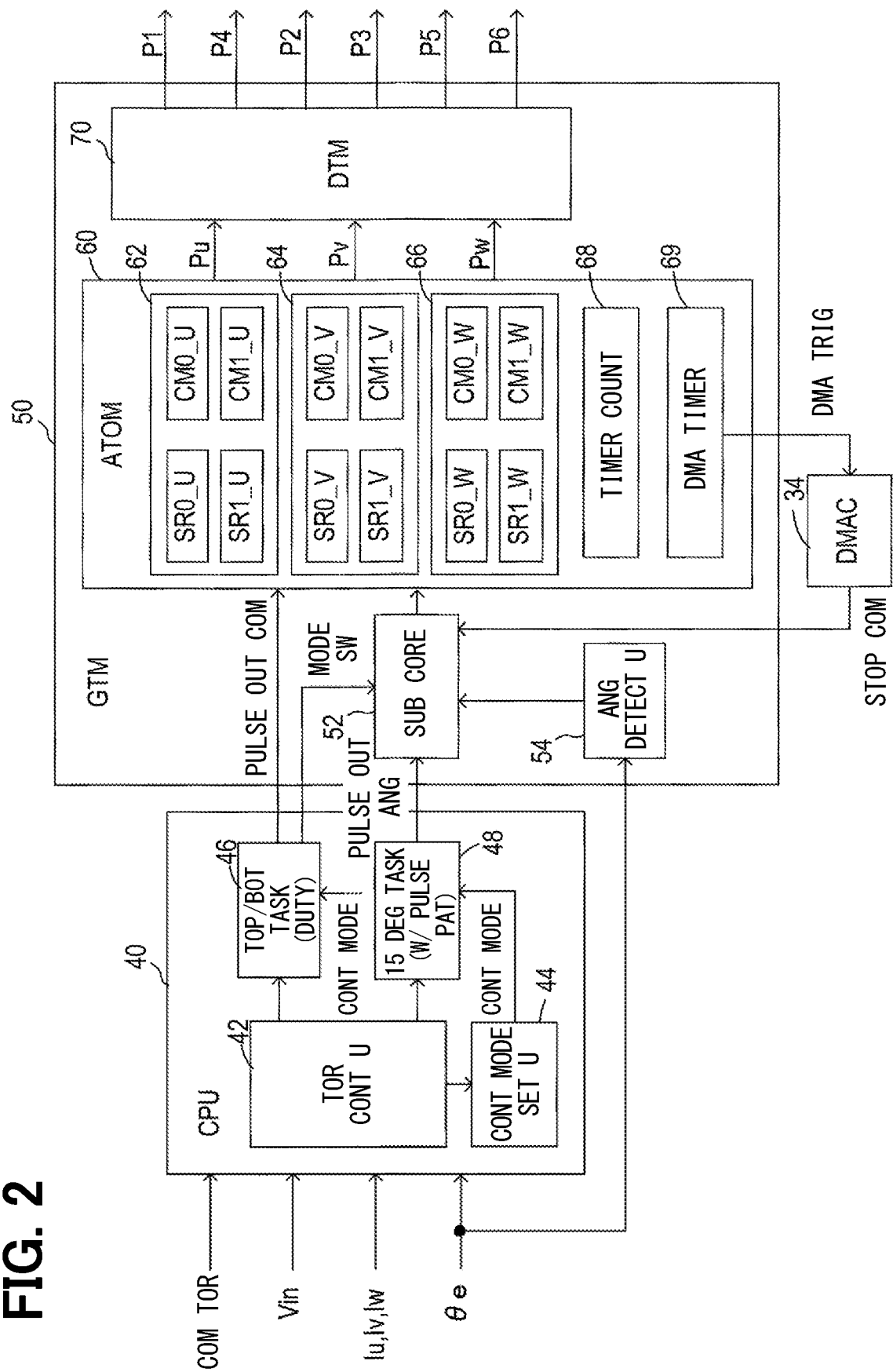
FIG. 2 is a block diagram showing the configuration of the motor control device shown in FIG. 1.

As shown in FIG. 2, in the control device 30, the CPU 40 has functions as a torque control unit 42, a control mode setting unit 44, a top/bottom task 46 and a 15° task 48. These functions are realized by the CPU 40 executing programs stored in the memory 32.

The torque control unit 42 calculates a phase command value φ and an amplitude command value Vn of the output voltage vector of the inverter 20 based on a command torque, a rotation angle θe of the motor 10, and phase currents Iu, Iv, and Iw of the motor 10.

That is, the torque control unit 42 estimates the actual torque of the motor 10 based on the rotation angle θe and the currents Iu, Iv, and Iw of the motor 10, and calculates the amplitude command value Vn and the phase command value φ as the operation amount for controlling the estimated actual torque to be the command torque. The amplitude command value Vn is defined as the square root of the sum of the square value of the d-axis voltage Vd, which is the d-axis component of the output voltage vector in the dq coordinate system, and the square value of the q-axis voltage Vq, which is the q-axis component of the output voltage vector in the dq coordinate system.

The control mode setting unit 44 selects either the PWM mode for PWM control or the angle synchronization mode for angle synchronization control as the control mode according to the modulation rate of the output voltage vector, in other words, the voltage utilization rate.

Then, when the control mode of the motor 10 is the PWM mode, the CPU 40 calculates the ON/OFF timing of each switching element Q1 to Q6 for driving the motor 10 with the command torque in the top/bottom task 46 which is executed at regular intervals.

That is, in the top/bottom task 46, first, the sinusoidal U-phase command voltage VU, the sinusoidal V-phase command voltage VV, and the sinusoidal W-phase command voltage VW are calculated based on the amplitude command value Vn and the phase command value φ calculated by the torque control unit 42. Then, by normalizing the calculated U-, V- and W-phase command voltages VU, VV and VW with the power supply voltage Vin detected by the voltage sensor 16, the U-, V- and W-phase command time ratios DTu and DTv, DTw are calculated.

Figure 4:
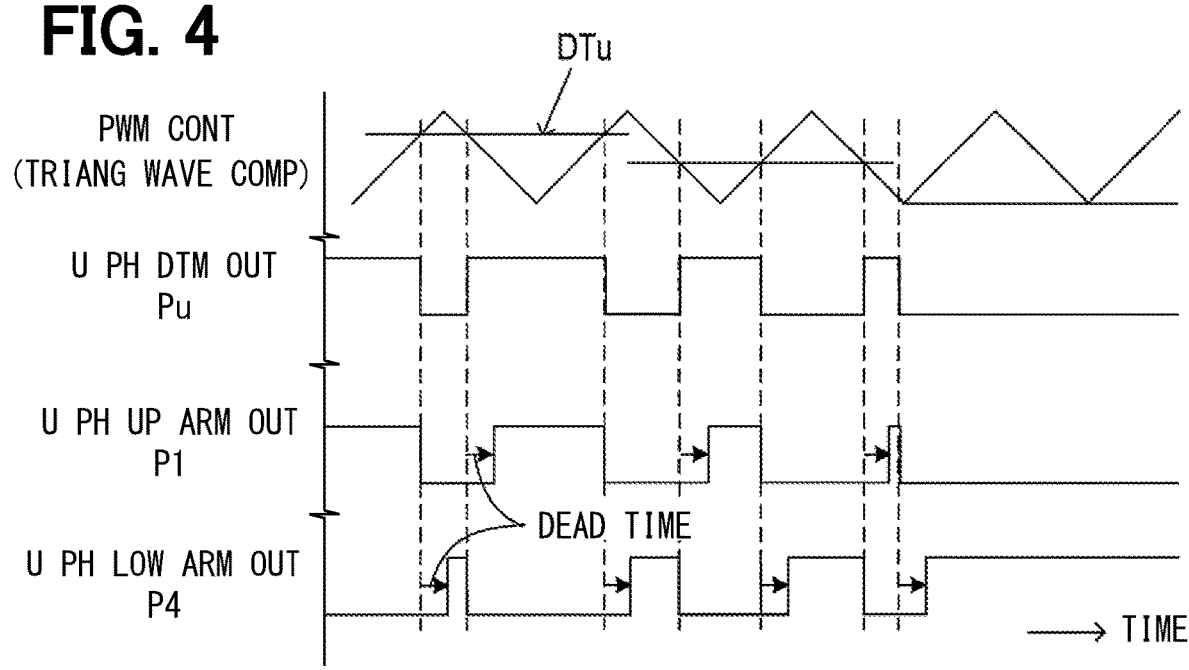
FIG. 4 is a time chart explaining the operation of the dead time module.

Next, as shown in FIG. 4, in the top/bottom task 46, the ON/OFF timings of each phase of the switching elements Q1 to Q6 by comparing the command time ratios DTu, DTv, and DTw of the respective phases with the triangular wave, which is the carrier signal for PWM control.

Then, in the top/bottom task 46, the drive signals P1 to P6 for driving the motor 10 under PWM control are output from the GTM 50 by outputting the calculated on/off timing of each phase as a pulse output command to the GTM 50.

FIG. 4 shows a state in which the ON/OFF timings of the U-phase switching elements Q1 and Q4 are calculated by comparing the command time ratio DTu of the U-phase with the triangular wave. As shown in FIG. 4, the triangular wave has an isosceles triangular shape in which the rate of increase and the rate of decrease are equal, and the top/bottom task 46 is executed at each peak timing of the top and the bottom of the triangular wave. DUTY shown in FIG. 4 represents the ON/OFF timing of the switching elements Q1 to Q6 of each phase.

Next, when the control mode of the motor 10 is the angle synchronization mode, the CPU 40 performs a 15° task 48 that is executed every predetermined rotation angle of the motor 10, in this embodiment, every 15 electrical degrees to obtain a pulse pattern for driving the motor 10 with the command torque. This pulse pattern is also calculated for each phase of the motor 10, like the on/off timings of the switching elements Q1 to Q6 calculated in the top/bottom task 46.

That is, in the 15° task 48, first, a rotation angular velocity, in other words, an electrical angular velocity, is obtained from the rotation angle θe of the motor detected by the rotation sensor 12, and based on the rotation angular velocity, the number of pulses output per one rotation of the motor is calculated. Based on the number of pulses and the amplitude command value Vn calculated by the torque control unit 42, a pulse pattern for angle synchronization control is selected from a plurality of preset pulse patterns.

In the 15° task 48, the angle synchronization control is executed by the sub core 52 different from the GTM 50 constituting the CPU 40 by outputting a pulse output angle for turning on/off each of the switching elements Q1 to Q6 to the GTM 50 according to the selected pulse pattern.

Note that the calculation operations in the top/bottom task 46 and the 15° task 48 described above are described in JP-2017-93029-A, so a more detailed description will be omitted here. In this embodiment, the top/bottom task 46 corresponds to the PWM control unit of the present embodiments, and the 15° task 48 corresponds to the angle calculation unit of the present embodiments.

Figure 3:
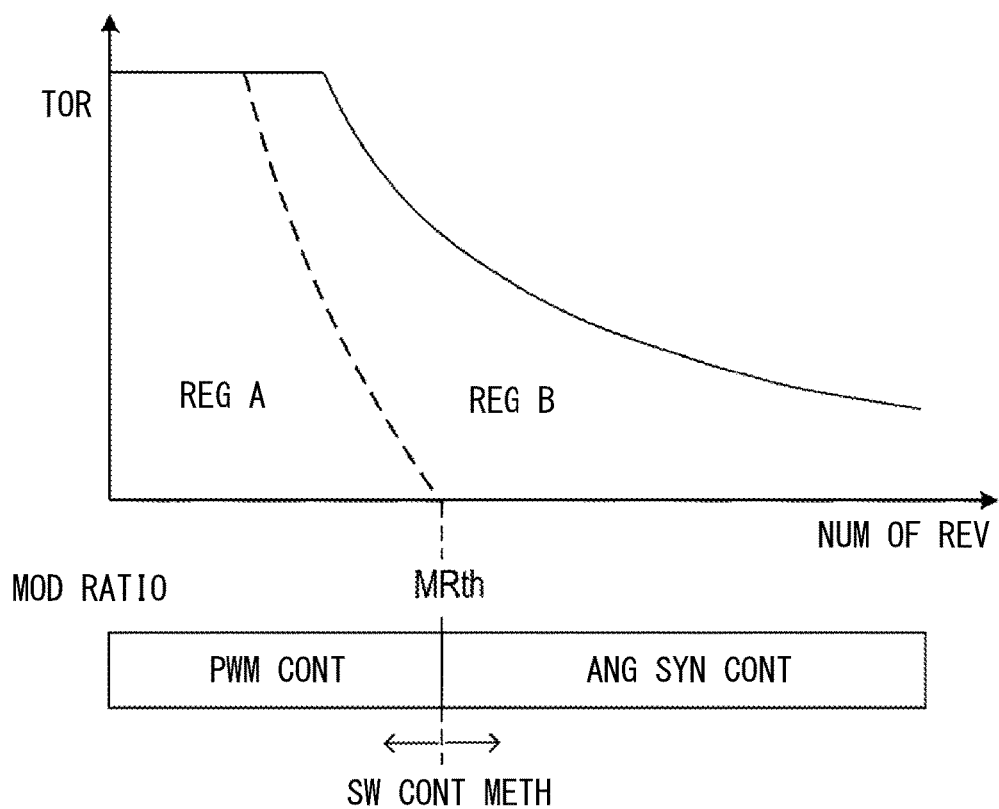
FIG. 3 is an explanatory diagram illustrating switching between PWM control and angle synchronization control by a control mode setting unit.

Here, as shown in FIG. 3, the switching of the control of the motor 10 between the PWM control and the angle synchronization control is performed because the control method is switched according to the modulation factor, which is the ratio between the amplitude command value of the output voltage from the inverter 20 and the power supply voltage.

That is, in this embodiment, the rotation region of the motor 10 is divided into a rotation region A in which the modulation rate is equal to or less than a predetermined value MRth (for example, 95%) and a rotation region B in which the modulation rate exceeds the predetermined value MRth.

In the rotation region A, the PWM control is selected as the control method, and in the rotation region B, the angle synchronization control is selected as the control method. It should be noted that this is because in the rotation region B where the modulation rate exceeds the predetermined value MRth, it may be difficult to drive the motor 10 in the PWM control since the voltage utilization factor becomes high.

Next, the GTM 50 is provided with a sub-core 52, an angle detector 54, an ARU-connected Timer Output Module (hereinafter ATOM) 60 and a Dead Time Module (hereinafter DTM) 70.

Here, the ATOM 60 outputs a pulse signal Pu, Pv, and Pw that complementarily turns on and off the switching elements in the conduction circuits 22, 24, and 26 provided in the inverter 20, that are, Q1 and Q4, Q2 and Q5, and Q3 and Q6. Note that the ATOM 60 corresponds to the timer circuit of the present embodiments.

The ATOM 60 is provided with U-phase, V-phase and W-phase timer circuits 62, 64 and 66 for generating pulse signals Pu, Pv and Pw of respective phases. The ATOM 60 is also provided with a timer counter 68 for clocking.

The timer circuits 62, 64, and 66 for U-phase, V-phase, and W-phase, respectively, have compare registers CM0, CM1 in which ON/OFF timings of switching elements Q1 and Q4, Q2 and Q5, and Q3 and Q6 of each phase are written.

Each of the timer circuits 62, 64 and 66 rises up the pulse signals Pu, Pv and Pw when the values of the compare register CM0 and timer counter 68 match, and falls down the pulse signals Pu, Pv, and Pw when the values of the compare register CM1 and timer counter 68 match.

Therefore, when the top/bottom task 46 is performing the PWM control, the on/off timings of the U-phase, V-phase, and W-phase calculated in the top/bottom task 46 are written in the compare registers CM0, CM1 of the respective timer circuits 62, 64, 66.

The pulse signals Pu, Pv and Pw are output from the respective timer circuits 62, 64 and 66 according to the on/off timings written in the compare registers CM0 and CM1, respectively, as shown in FIG. 4. FIG. 4 shows the pulse signal Pu output from the timer circuit 62 for the U phase.

Next, based on the pulse signals Pu, Pv, Pw output from the respective timer circuits 62, 64, 66, the DTM 70 generates the drive signals P1 to P6 for turning on and off complementarily the switching elements Q1 and Q4, Q2 and Q5, Q3 and Q6 of each phase.

In addition, the DTM 70 delays the rising up timing of the drive signals P1 to P6 output to the switching elements Q1 to Q6 by a predetermined dead time so that the switching elements Q1 and Q4, Q2 and Q5, Q3 and Q6 are not turned on at the same time.

That is, as shown in FIG. 4, the DTM 70 delays the rise of the pulse signals Pu, Pv, Pw input from the timer circuits 62, 64, 66 by a predetermined dead time, and generates the drive signals P1-P3 of the switching elements Q1 to Q3, which are the upper arm switches.

Further, the drive signals P4 to P6 of the switching elements Q4 to Q6, which are the lower arm switches, are obtained by inverting the pulse signals Pu, Pv, Pw input from the timer circuits 62, 64, 66, and delaying the rise of the pulse signals Pu, Pv, Pw by a predetermined dead time.

As a result, it is possible to prevent the switching elements Q1 and Q4, Q2 and Q5, and Q3 and Q6 for the respective phases from being turned on at the same time.

Next, the sub-core 52 and the angle detection unit 54 are provided for outputting the pulse signals Pu, Pv, Pw from the respective timer circuits 62, 64, 66 at the pulse output angle of each phase output from the 15° task 48.

In other words, the ATOM 60 generates the pulse signals Pu, Pv, Pw by detecting the on/off timings using the timer counter 68 for clocking, and therefore, does not generate the pulse signals Pu, Pv and Pw according to the rotation angle of the motor 10.

Therefore, in this embodiment, the angle detection unit 54 monitors the rotation angle of the motor 10 based on the detection signal from the rotation sensor 12. When the rotation angle of the motor 10 monitored by the angle detection unit 54 becomes constant with the pulse output angle of each phase, the sub-core 52 generates the pulse signals Pu, Pv, Pw from the corresponding timer circuits 62, 64, 66.

Specifically, when the rotation angle of the motor 10 coincides with the pulse output angle of each phase, the sub-core 52 sets a predetermined value in the compare register CM0 or CM1 of each phase, so that the corresponding timer circuits 62, 64, 66 output the pulse signals Pu, Pv and Pw immediately.

Further, the sub-core 52 is configured to start performing the angle synchronization control when the rotation angle of the motor 10 is an electrical angle of 0°, 60°, 120°, 180°, 240°, or 300° so that the angle synchronization control can be properly performed. Since the sub-core 52 executes the angle synchronization control according to the pulse pattern calculated by the 15° task 48, it corresponds to the angle synchronization control unit of the present embodiment.

On the other hand, the top/bottom task 46 is configured to execute the PWM control by writing ON/OFF timings for PWM control to the shadow registers SR0 and SR1 provided in the timer circuits 62, 64 and 66 of each phase of the ATOM 60. Note that the shadow registers SR0 and SR1 correspond to data registers of the present embodiment.

In the ATOM 60, the on/off timings written in the shadow registers SR0 and SR1 of each phase in the top/bottom task 46 are written in the compare registers CM0 and CM1 at the same intervals as the execution cycle of the top/bottom task 46.

Therefore, when the control mode is the PWM mode, the pulse signals Pu, Pv, Pw are output from the ATOM 60 at the ON/OFF timings written in the shadow registers SR0, SR1 by the top/bottom task 46.

Here, the compare registers CM0 and CM1 are updated after a predetermined time has elapsed since the on/off timing is written in the shadow registers SR0 and SR1. Therefore, when the control mode is switched, the pulse signals Pu, Pv, and Pw output from the ATOM 60 may be used for other controls before switching the control mode, and the PWM control and the angle synchronization control may interfere with each other.

When mutual interference between the PWM control and the angle synchronization control occurs in this manner, the control of the motor 10 becomes unstable, causing an overcurrent to flow through the motor 10 and causing a large torque fluctuation in the motor 10. Therefore, in this embodiment, the top/bottom task 46 and the sub-core 52 operate so that the PWM control and the angle synchronization control do not interfere with each other.

Figure 5:
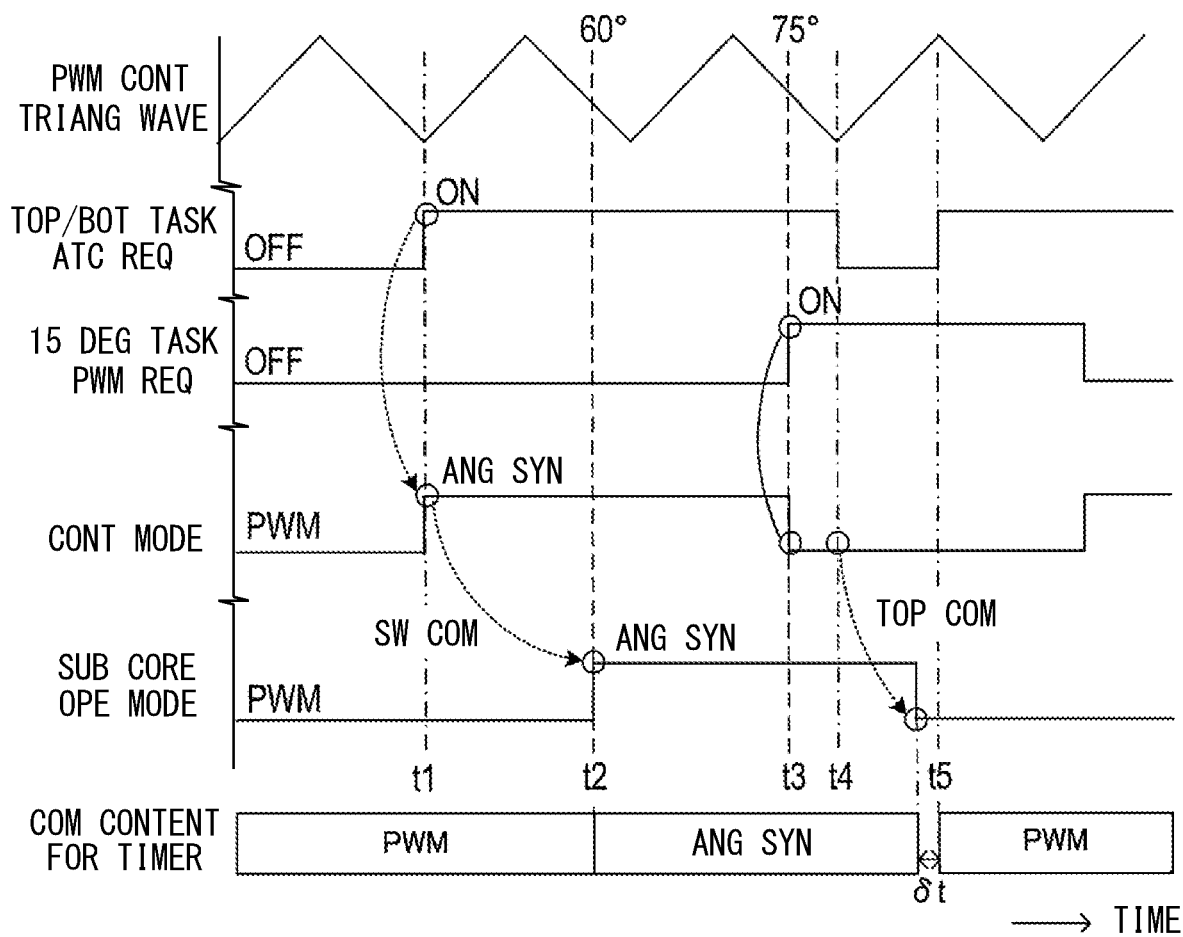
FIG. 5 is a time chart showing the relationship between the control mode set by the control mode setting unit and the switching timing of the control method.

That is, as shown in FIG. 5, when the control mode set by the control mode setting unit 44 changes from the PWM mode to the angle synchronization mode, the top/bottom task 46 determines that an angle synchronization request is input at time t1, and outputs the switching command to the sub-core 52 to switch to the angle synchronization mode. Note that the switching command to this angle synchronization mode corresponds to the first switching command of the present embodiment.

Then, at time t2 when the rotation angle of the motor 10 reaches the rotation angle at which the start of angle synchronization control is permitted, for example, 60 degrees, the sub-core 52 switches its own operation mode from the PWM mode to the angle synchronization mode to start the angle synchronization control. Note that the operation mode of the sub-core 52 corresponds to the first operation mode of the present embodiment.

On the other hand, for example, when the control mode set by the control mode setting unit 44 changes from the angle synchronization mode to the PWM mode at time t3, the 15° task 48 determines that the PWM request has been input at time t3. Also, the top/bottom task 46 determines that a PWM request has been input at time t4.

Then, the top/bottom task 46 outputs the stop command of the angle synchronization control to the sub-core 52 to stop the angle synchronization control by the sub core 52 immediately before the start timing, for example, 1 μs and to start the PWM control at time t5, which is the next start timing after a certain period of time has elapsed. Note that this stop command corresponds to the second switching command of the present embodiment.

Then, the sub-core 52 switches its operation mode to the PWM mode and stops the angle synchronization control. Therefore, the sub-core 52 stops the angle synchronization control a predetermined time δt before the time t5, which is the next start timing of the PWM control, and the top/bottom task 46 can start the PWM control at the time t5.

Therefore, according to the present embodiment, simultaneous execution of the PWM control by the top/bottom task 46 and the angle synchronization control by the sub-core 52 can be suppressed, and these controls can be executed appropriately.

The top/bottom task 46 also uses the DMA timer 69 provided in the ATOM 60 to output a stop command as a second switching command to the sub-core 52. DMA is an abbreviation for Direct Memory Access.

That is, the DMA timer 69 has compare registers CM0 and CM1, like the timer circuits 62 to 66 described above. Then, the top/bottom task 46 sets the compare register CM0 of the DMA timer 69 to, for example, "t5−1 μs" as the output start timing of the DMA trigger. The top/bottom task 46 also sets time t5 in the compare register CM1 of the DMA timer 69 as the output stop timing of the DMA trigger.

As a result, the DMA timer 69 outputs a DMA trigger to the DMA controller (hereinafter referred to as DMAC) 34 of the memory 32 immediately before the next PWM control start timing. Then, the DMAC 34 receives the DMA trigger and causes the sub-core 52 to DMA-transfer the stop command stored in the predetermined area of the memory 32.

Therefore, the CPU 40 can input the stop command to the sub-core 52 at a desired timing without causing the 15° task 48 to monitor the output timing of the stop command, thereby reducing the processing load.

Also, the control stop period from when the stop command is output to the sub-core 52 to when the PWM control by the top/bottom task 46 is started can be arbitrarily set by the set timing of the compare registers CM0 and CM1 of the DMA timer 69. Therefore, the control stop period can be appropriately adjusted at the time of designing the control device 30 so that the stop of control does not cause an overcurrent or a large torque fluctuation.

Figure 6:
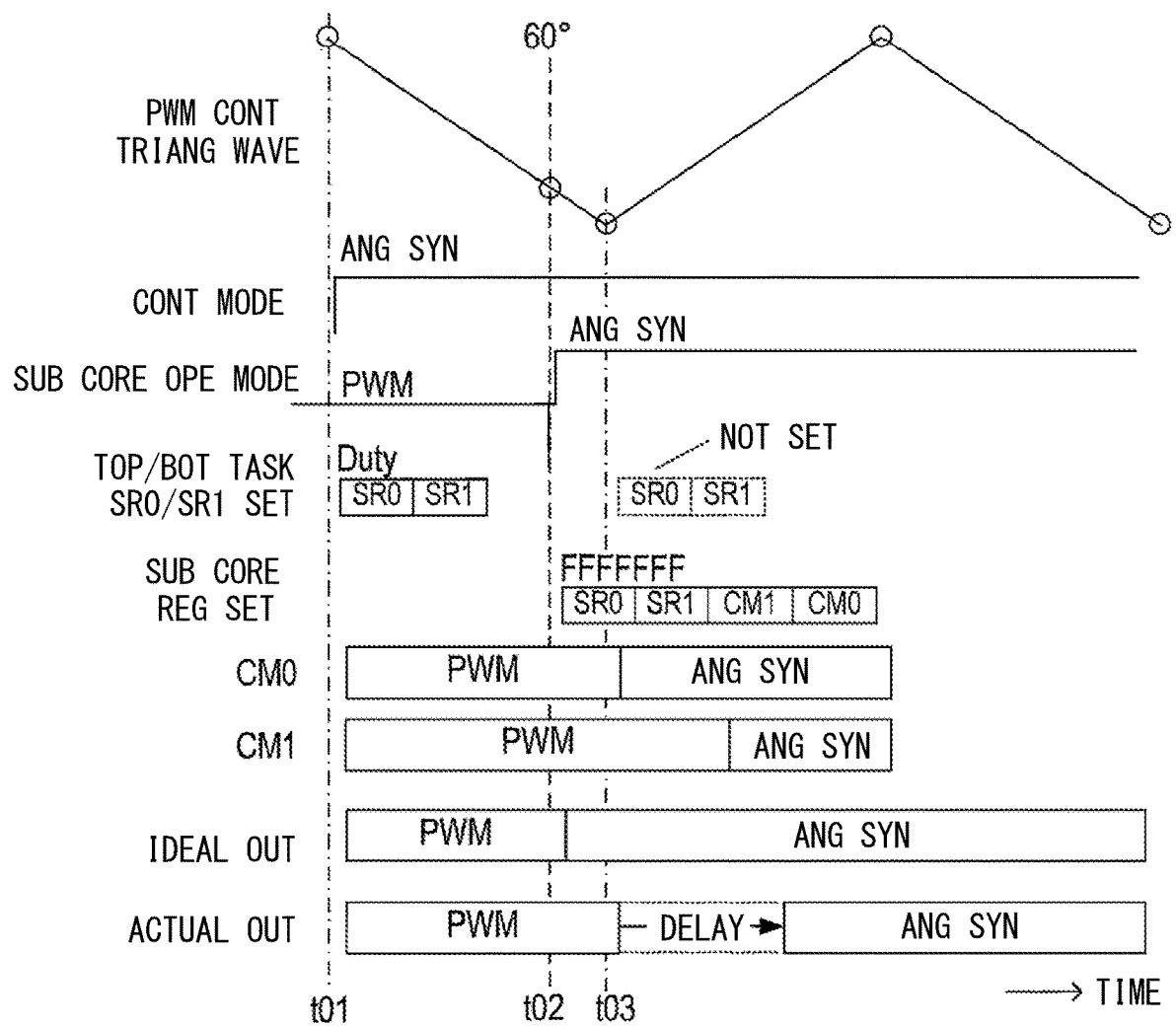
FIG. 6 is a time chart showing register setting operations when the control mode changes to the angle synchronization mode.

Further, as shown in FIG. 6, when the top/bottom task 46 receives an angle synchronization request from the control mode setting unit 44 at time t01 and outputs a switching command to the sub-core 52, the top/bottom task 46 continues the PWM control until the operation mode of the sub-core 52 is changed to angle synchronization mode. That is, the writing of ON timings to the shadow registers SR0 and SR1 of the timer circuits 62, 64 and 66 of each phase of the ATOM 60 is continued.

As a result, when the control mode set by the control mode setting unit 44 changes from the PWM mode to the angle synchronization mode, the control of the motor 10 is prevented from being stopped until the angle synchronization control is started by the sub-core 52.

On the other hand, when the sub-core 52 switches its own operation mode from the PWM mode to the angle synchronization mode in response to the switching command from the top/bottom task 46 (at time t02), the sub core 52 writes the specified value to the shadow registers SR0, SR1 of the timer circuits 62, 64, 66 of each phase.

This specified value is a value that does not match the value of the timer counter 68, in other words, a value that is not compared, and for example, the maximum value "FFFFFFFF" is used. When the operation mode of the sub-core 52 is switched to the angle synchronization mode and the predetermined values are written to the shadow registers SR0 and SR1 of each phase, the sub-core 52 starts outputting to the compare registers CM0 and CM1 of each phase by angle synchronization control.

Therefore, until the ATOM 60 outputs a pulse signal corresponding to the pulse output angle calculated by the 15° task 48, the sub core 52 restricts to write the ON/OFF timing for PWM control to the compare registers CM0 and CM1.

In other words, when the sub-core 52 starts angle synchronization control, if the ON/OFF timing for PWM control remains in the shadow registers SR0 and SR1, the pulse signal may be output from the ATOM 60 before the sub-core 52 causes the ATOM 60 to output the pulse signal.

Therefore, the sub-core 52 writes the predetermined values to the shadow registers SR0 and SR1 of each phase before starting the angle synchronization control, thereby suppressing output of the pulse signal not for the angle synchronization control from the ATOM 60. Therefore, according to the present embodiment, the operation of the sub-core 52 can also prevent mutual interference between the PWM control and the angle synchronization control when switching the control mode.

At the start of the angle synchronization control, the sub-core 52 writes the predetermined values to the shadow registers SR0 and SR1 of each phase, thereby delaying the start of the angle synchronization control, but the motor control does not become unstable since the delay time is very short.

When writing to each of the registers SR0, SR1, CM0, and CM1 as described above, the writing order of the shadow registers SR0 and SR1 or the writing order of the compare registers CM0 and CM1 may be changed according to the edge direction of the pulse at the start of the angle synchronization control.

Also, if the delay in starting the angle synchronization control can be permissible, the sub-core 52 may write the predetermined value (e.g., "FFFFFF") redundantly to the compare registers CM0 and CM1, and then may output a rising edge command or a falling edge command.

Also, at a predetermined rotation angle position of every 60 degrees, the operation mode of the sub-core 52 is switched from the PWM mode to the angle synchronization mode, and the sub-core 52 writes the predetermined values to the shadow registers SR0 and SR1 of each phase, so that the predetermined value may be rewritten.

Figure 7:
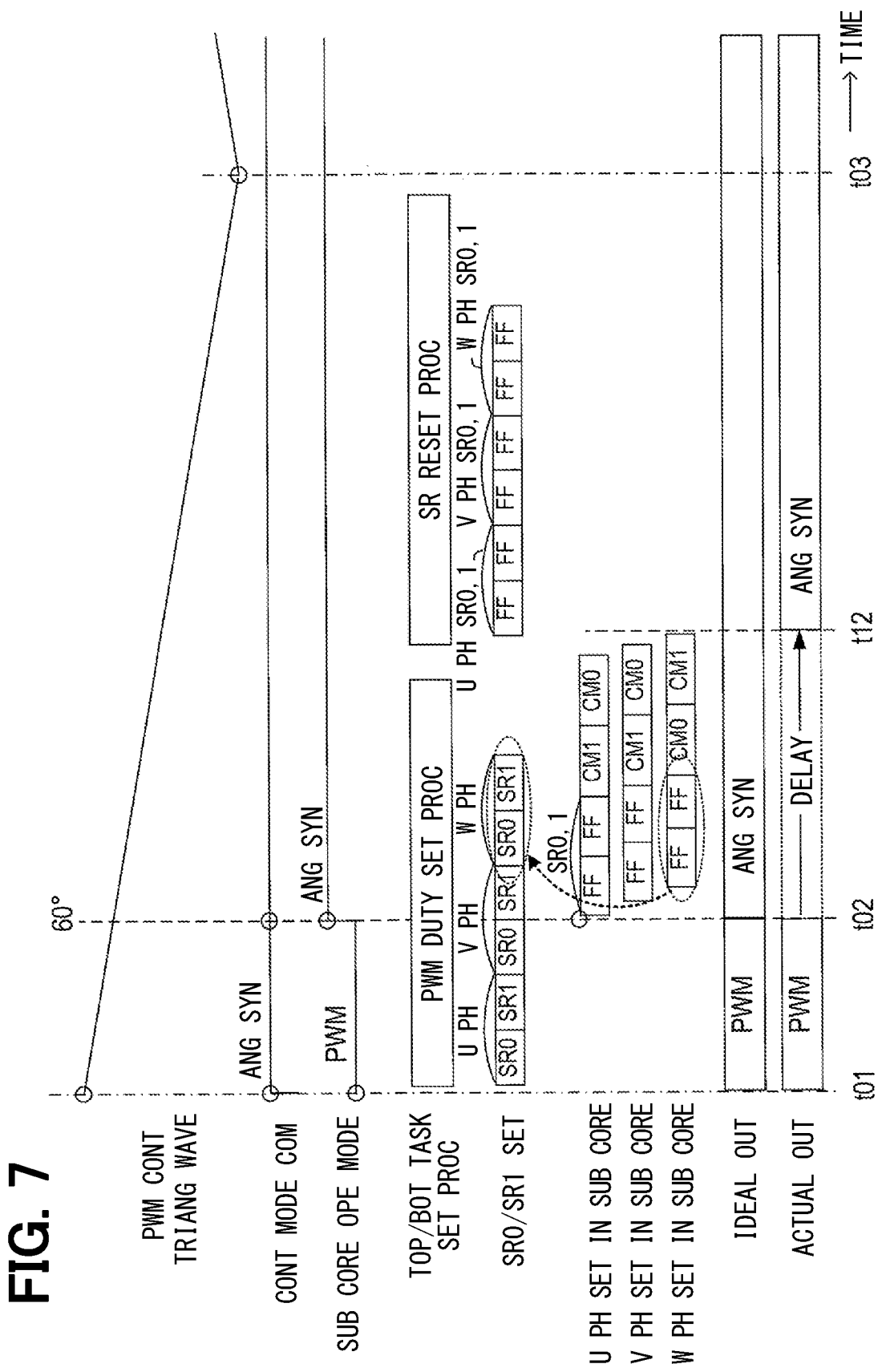
FIG. 7 is a time chart showing details of a register setting operation shown in FIG. 6.

That is, as shown in FIG. 7, at time t02 when the operation mode of the sub-core 52 is switched to the angle synchronization mode, the top/bottom task 46 is writing to the shadow registers SR0 and SR1 of each phase by the PWM control started at time t01.

In this case, even if the sub-core 52 writes predetermined values to the shadow registers SR0 and SR1 of each phase at the start of angle synchronization control, the on/off timing for the PWM control may be written in some of the shadow registers SR0 and SR1 by the top/bottom task 46.

Therefore, after the top/bottom task 46 writes the ON/OFF timing for PWM control to the shadow registers SR0 and SR1 of each phase by the PWM control (at time t12), the top/bottom task 46 checks whether the operation mode of the sub-core 52 changes from the PWM mode to the angle synchronization mode. Then, when the operation mode of the sub-core 52 is changed from the PWM mode to the angle synchronization mode, SR resetting processing is performed to write the predetermined values to the shadow registers SR0 and SR1 of each phase.

Therefore, according to the present embodiment, the SR resetting process by the top/bottom task 46 can more satisfactorily suppress mutual interference between the PWM control and the angle synchronization control when switching the control mode.

[Control Process]

Next, the control processing executed in the CPU 40 to realize the functions of the top/bottom task 46 and the 15° task 48 and the control processing executed in the sub-core 52 will be described.

Figure 8:
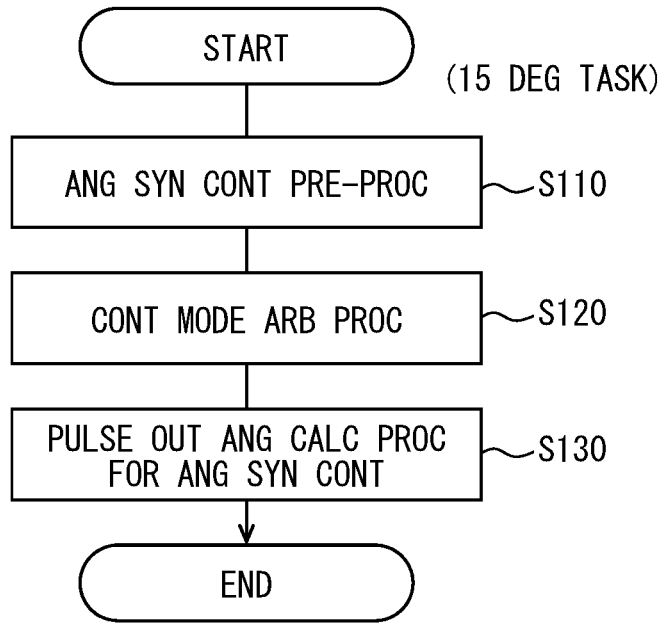
FIG. 8 is a flow chart showing a control processing executed in a 15° task.

As shown in FIG. 8, the functions of the 15° task 48 are as follows in this order: first, angle synchronization control pre-processing is executed in S110; control mode arbitration processing is executed in S120; and the pulse output angle calculation process for the angle synchronization control is executed in S130.

In the angle synchronization control pre-processing of S110, as described above, the number of pulses to be output per one motor rotation is obtained based on the rotation angular velocity of the motor, and a pulse pattern is selected based on the number of pulses and the amplitude command value Vn calculated by the torque control unit 42.

In the control mode arbitration process of S120, after the angle synchronization mode is set by the control mode setting unit 44, until the sub-core 52 stops the angle synchronization control, the operation mode of itself is set to the angle synchronization mode, and the operation mode of itself is set to the PWM mode in a period other than this period.

In the pulse output angle calculation process of S130, when the operation mode of itself is the angle synchronization mode, the next pulse output angle is specified according to the pulse pattern of each phase selected in the angle synchronization control pre-processing, and it is output to the sub-core 52. The processes of S110 and S130 are performed for each phase of the motor 10.

Figure 9:
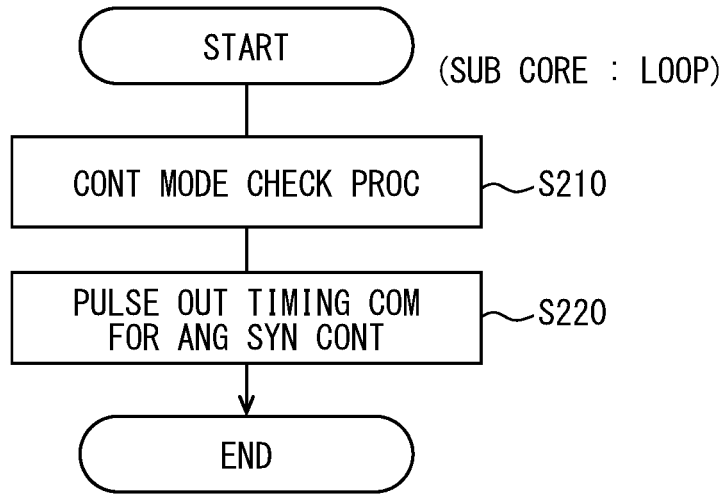
FIG. 9 is a flow chart showing a control processing executed by a sub-core.

Next, as shown in FIG. 9, the sub-core 52 repeatedly executes the control mode check process of S210 and the pulse output timing command process for angle synchronization control of S220.

In the control mode check process of S210, input of an operation mode switching command or a stop command from the top/bottom task 46 is checked.

When the operation mode of the sub-core 52 itself is the PWM mode, upon receiving an operation mode switching command from the top/bottom task 46, the operation mode of the sub-core 52 is switched to the angle synchronization mode at the next rotation angle position every 60 degrees.

Further, when the operation mode of the sub-core 52 itself is the angle synchronization mode, upon receiving a stop command from the top/bottom task 46, the operation mode of itself is immediately switched to the PWM mode.

Next, in the pulse output timing command process for angle synchronization control in S220, the current rotation angle of the motor 10 is obtained from the angle detection unit 54 when the operation mode of itself is the angle synchronization mode.

Then, when the acquired rotation angle matches the pulse output angle input from the 15° task 48, a count value of 1 is set in the compare register CM0 or CM1 of the phase corresponding to the matched pulse output angle, so that a pulse signal is output, and the process proceeds to S210.

Specifically, when the corresponding phase pulse signal rises, a value of 1 is set in the compare register CM0, and a value (for example, "FFFFFFFF") that is not compared is set in the compare register CM1. When the corresponding phase pulse signal falls, the compare register CM1 is set to a value of 1, and the compare register CM0 is set to a value that is not compared. As a result, a signal representing the rise or fall of the pulse signal is output from the compare register CM0 or CM1 set to the value 1, and the pulse signals Pu, Pv, and Pw of each phase are output from the ATOM 60.

Further, in S220, when the rotation angle acquired from the angle detection unit 54 does not match the pulse output angle input from the 15° task 48, the output of the pulse signals Pu, Pv, Pw from the ATOM 60 is not changed, and the process proceeds to S210.

Figure 10:
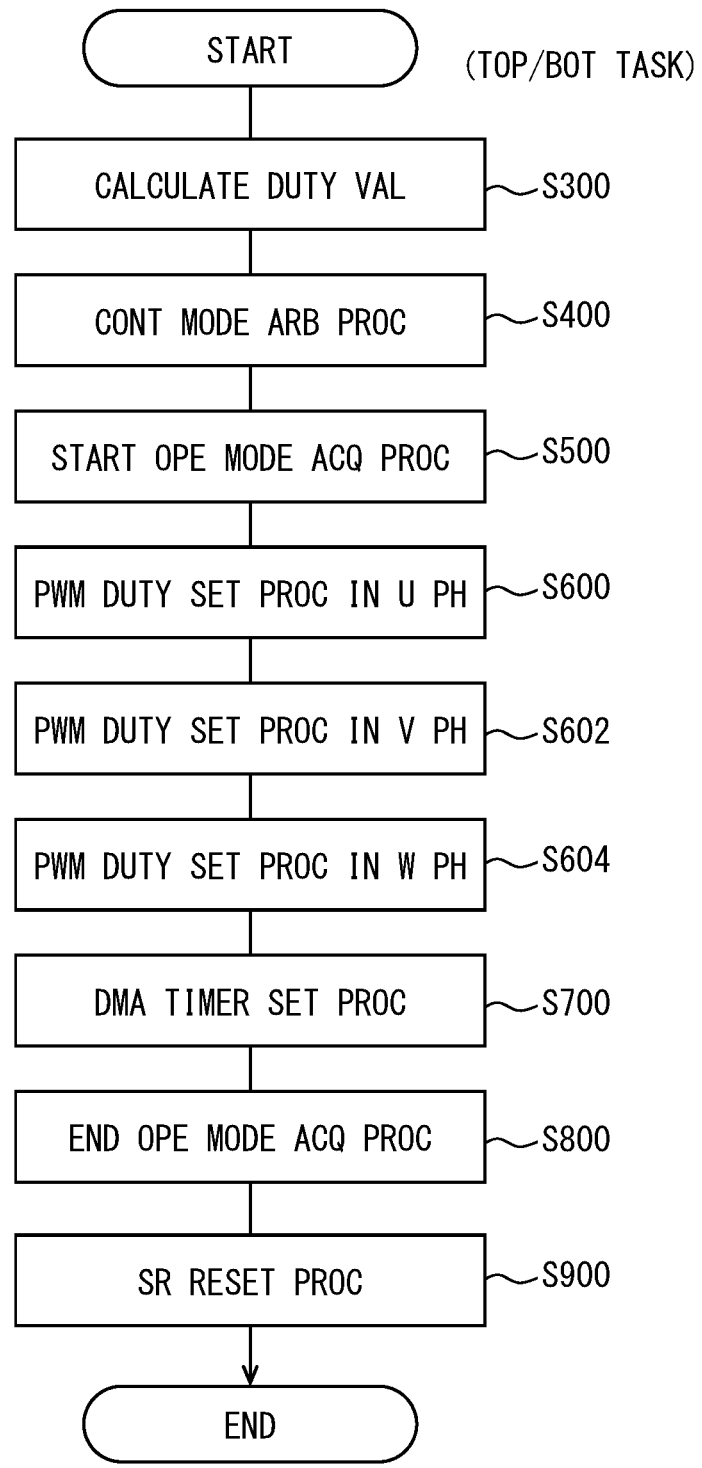
FIG. 10 is a flow chart showing a control processing executed in a top/bottom task.

Next, in the CPU 40, the function of the top/bottom task 46 is realized by executing the control processing according to the procedure shown in FIG. 10 at every top and bottom timings of the triangular wave as the carrier signal of the PWM control, i.e., at every predetermined intervals.

As shown in FIG. 10, in the control process of the top/bottom task 46, first, at S300, a duty value calculation process for calculating the ON/OFF timings of the switching elements Q1 to Q6 of each phase by PWM control is executed.

Specifically, in the duty value calculation process of S300, the top/bottom task 46 first calculates the U-phase, the V-phase, and the W-phase command voltages VU, VV, and VW based on the duty amplitude command value Vn and the phase command value cp. By normalizing the calculated U-phase, the V-phase and the W-phase command voltages VU, VV and VW with the power supply voltage Vin, the U-phase, the V-phase and the W-phase command time ratios DTu, DTv and DTw are calculated.

Further, in the duty calculation process, the on/off timing of the switching element of each phase is calculated as a duty value by comparing the calculated command time ratios DTu, DTv, and DTw of each phase with the triangular wave.

Figure 11:
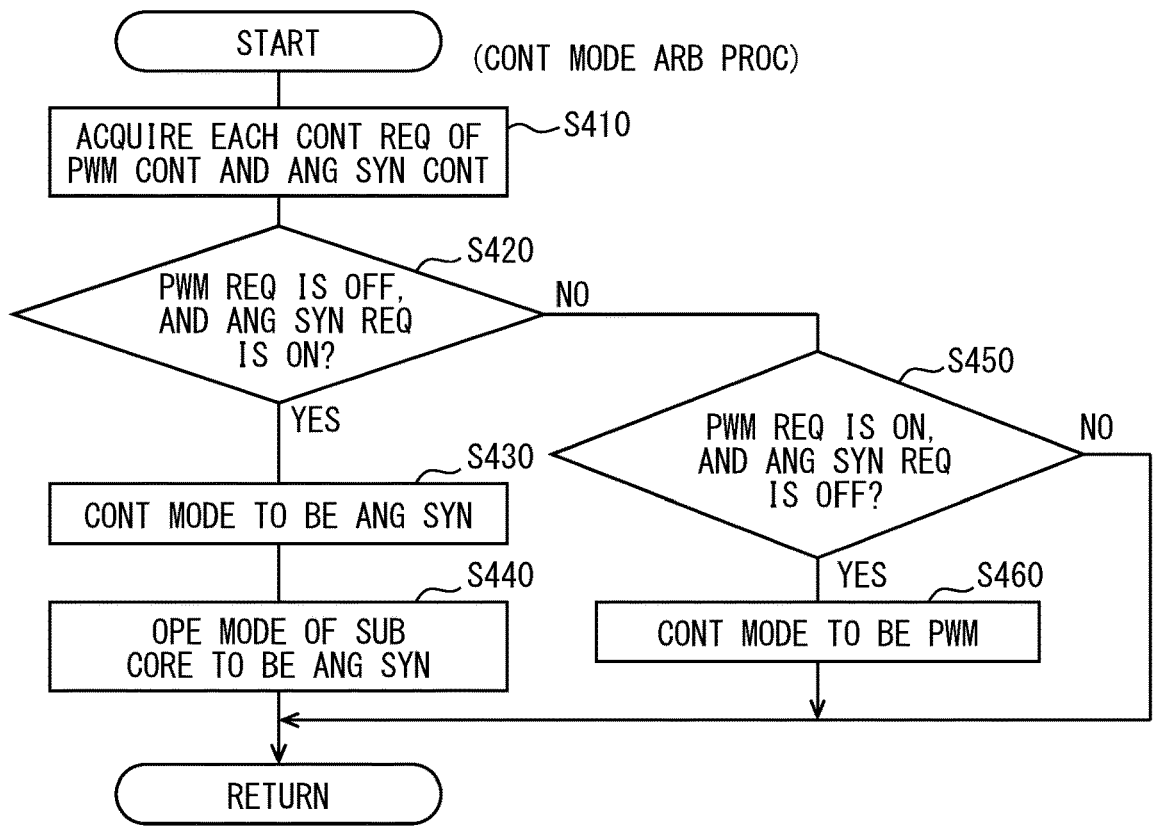
FIG. 11 is a flowchart showing a control mode arbitration processing executed in S400 of FIG. 10.

Next, in S400, a control mode arbitration process is executed according to the procedure shown in FIG. 11. This control mode arbitration process determines whether or not to switch the operation mode of the sub-core 52 to the angle synchronization mode based on the control mode set by the control mode setting unit 44.

That is, in the control mode arbitration process, first, at S410, a control request for PWM control and angle synchronization control from the control mode setting unit 44 is acquired. Then, in subsequent S420, based on the control request acquired in S410, it is determined whether the PWM request is in the OFF state and the angle synchronization request is in the ON state, that is, it is determined whether the control request from the control mode setting unit 44 is the control request for the angle synchronization control and not a control request for the PWM control.

When it is determined in S420 that the PWM request is in the off state and the angle synchronization request is in the on state, the process proceeds to S430, and the control mode requested by the control mode setting unit 44 is set to be the angle synchronization mode. Then, the process proceeds to S440.

At S440, since the control mode is the angle synchronization mode, a switching command is output to the sub-core 52 to set the operation mode of the sub-core 52 to the angle synchronization mode, and the control mode arbitration process ends.

By outputting the switching command in S440, the operation mode of the sub-core 52 is switched from the PWM mode to the angle synchronization mode at the next rotation angle position every 60 degrees.

On the other hand, if it is determined in S420 that the PWM request is in the OFF state and the angle synchronization request is not in the ON state, the process proceeds to S450 to determine whether the PWM request is in the ON state and the angle synchronization request is in the OFF state.

Then, when the PWM request is in the on state and the angle synchronization request is in the off state, the process proceeds to S460, the control mode requested by the control mode setting unit 44 is set to the PWM mode, and the control mode arbitration process ends.

Further, when it is determined in S450 that both the PWM request and the angle synchronization request are in the ON state or the OFF state, the control request from the control mode setting unit 44 is in anomaly, so the control mode is not set, and the control mode arbitration process ends.

Figure 12:
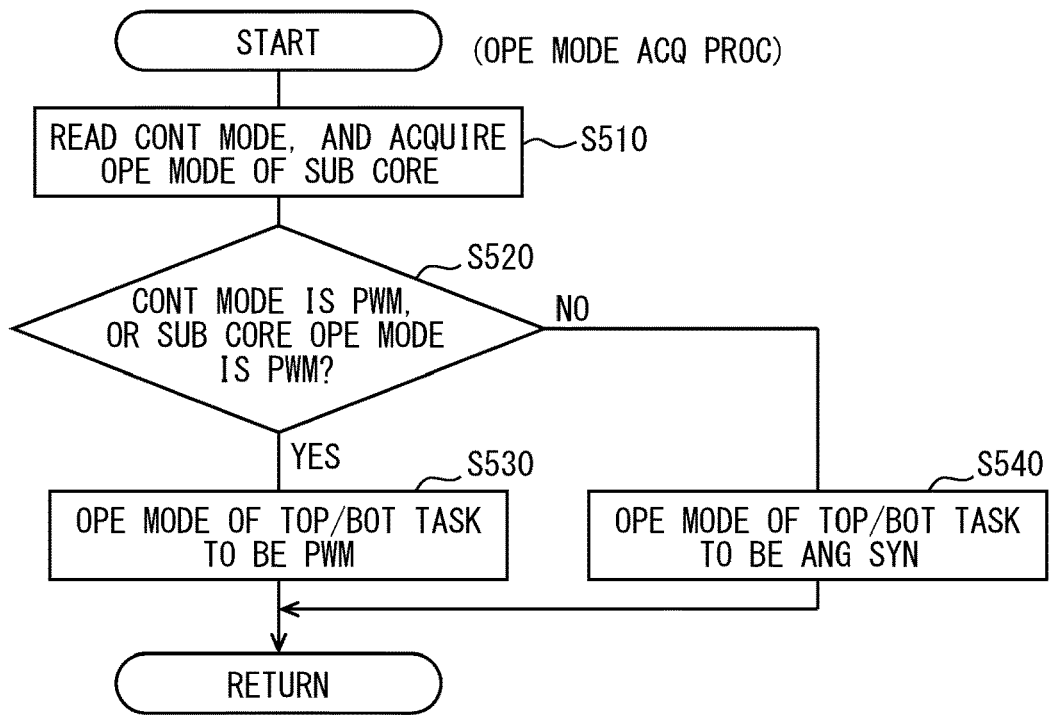
FIG. 12 is a flowchart showing an operation mode acquisition processing executed in S500 and S800 of FIG. 10.

Next, in the top/bottom task 46, when the control mode arbitration process of S400 ends, the process proceeds to S500, and the operation mode acquisition process is executed according to the procedure shown in FIG. 12.

Note that the operation mode acquisition process is executed in S800 not only when the top/bottom task 46 starts to operate at regular time intervals, but also when the operation ends. Therefore, in the following description, the processing of S500 is also referred to as start operation mode acquisition processing, and the processing of S800 is also referred to as end operation mode acquisition processing.

As shown in FIG. 12, in the operation mode acquisition process, first, at S510, the control mode set in S430 or S460 of the control mode arbitration process is read, and the operation mode of the sub-core 52 itself is read from the sub-core 52.

Note that the operation mode of the sub-core 52 itself acquired from the sub-core 52 in S510 corresponds to the first operation mode of the present embodiment, and the operation mode of the top/bottom task 46 itself set in the following processing corresponds to the second operation mode of the present embodiment.

Next, in S520, it is determined whether or not at least one of the control mode acquired in S510 and the operation mode of the sub-core 52 is the PWM mode.

Then, when it is determined in S520 that at least one of the control mode acquired in S510 and the operation mode of the sub-core 52 is the PWM mode, the process proceeds to S530 to set the operation mode of the top/bottom task 46 itself to the PWM mode. Then, the operation mode acquisition process ends.

Further, when it is determined in S520 that both the control mode acquired in S510 and the operation mode of the sub-core 52 are the angle synchronization mode, the process proceeds to S540, and the operation mode of the top/bottom task 46 itself is set to the angle synchronization mode, and the operation mode acquisition process ends.

As described above, in the top/bottom task 46, when the start operation mode acquisition process is executed in S500, the duty setting process for PWM of U-phase, V-phase, and W-phase is sequentially executed in S600, S602, and S604.

Figure 13:
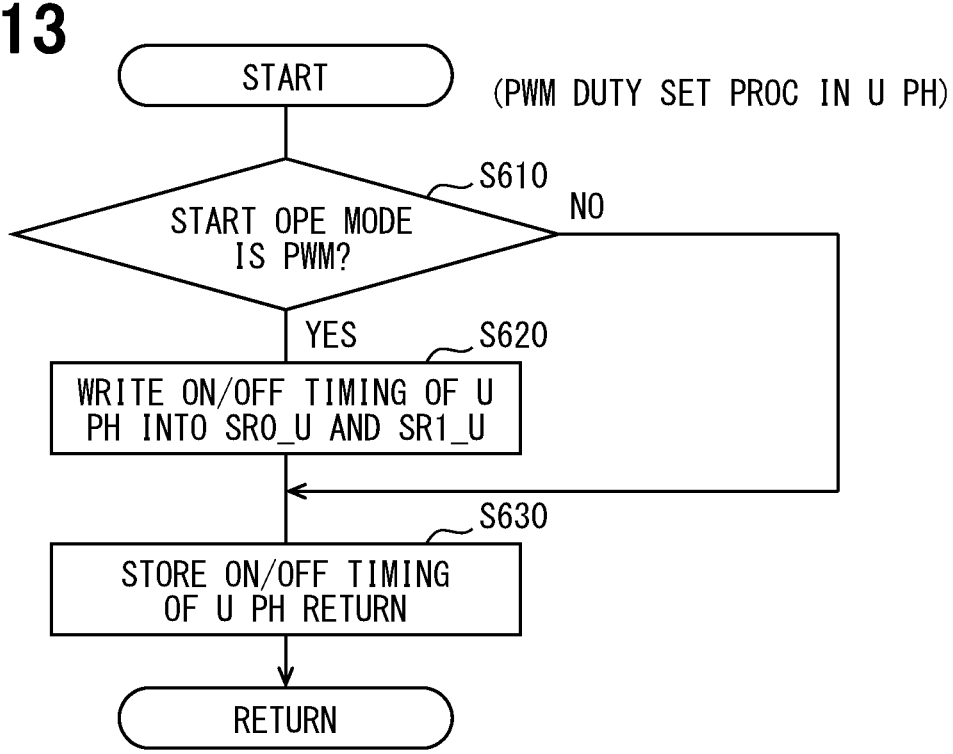
FIG. 13 is a flowchart showing a PWM duty setting process executed in S600 of FIG. 10.

In the U-phase PWM duty setting process, as shown in FIG. 13, at S610, it is determined whether the operation mode of the top/bottom task 46 itself set in the stat operation mode acquisition process at S500, that is, the start operation mode is the PWM mode.

Then, if the start operation mode is the PWM mode in S610, the process proceeds to S620, and the on/off timing of the U phase calculated at S300 is written in the shadow registers SR0 and SR1 of the U-phase timer circuit 62 in order to execute the PWM control. Then, the process proceeds to S630.

On the other hand, if it is determined in S610 that the start operation mode is not the PWM mode, the process proceeds to S630 without executing the process of S620.

Then, in S630, the U-phase on/off timing calculated in S300 is stored in a predetermined storage area of the memory 32 as the on/off timing for resetting, and the duty setting process for PWM ends.

The V-phase PWM duty setting process executed in S602 and the W-phase PWM duty setting process executed in S604 are the same procedures as the U-phase PWM duty setting process shown in FIG. 13, so the description is omitted.

Next, when the PWM duty setting process of S600 to S604 is executed in the top/bottom task 46, the process shifts to S700, and the DMA timer setting process is executed.

Figure 14:
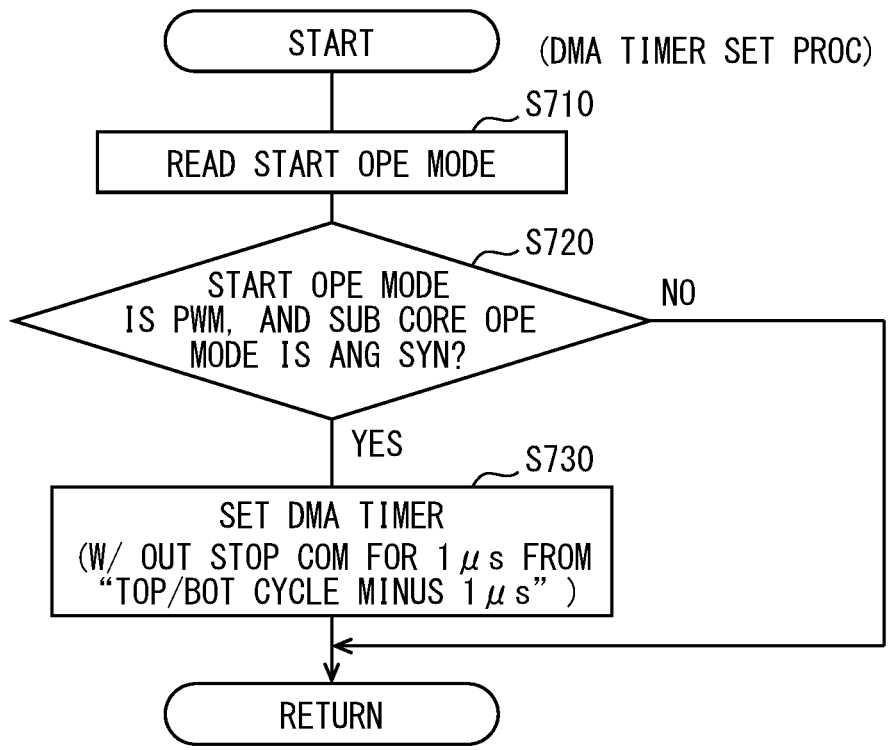
FIG. 14 is a flowchart showing a DMA timer setting processing executed in S700 of FIG. 10.

As shown in FIG. 14, in the DMA timer setting process, first, at 710, the start control mode of the top/bottom task 46 set at S500 is read. Then, in subsequent S720, it is determined whether or not the start operation mode read in S710 is the PWM mode and the operation mode of the sub-core 52 is the angle synchronization mode.

When the start operation mode is the PWM mode and the operation mode of the sub-core 52 is the angle synchronization mode, it is necessary to stop the angle synchronization control by the sub-core 52 and start the PWM control by the top/bottom task 46.

Therefore, when it is determined in S720 that the operation mode at start is the PWM mode and the operation mode of the sub-core 52 is the angle synchronization mode, the process proceeds to S730. At S730, the DMA timer 69 is set so that a stop command is output immediately before the top/bottom task 46 starts the next control process.

As a result, the DMA trigger is output from the DMA timer 69 just before the top/bottom task 46 next starts control processing, and the DMAC 34 causes the sub-core 52 to DMA-transfer the stop command stored in the predetermined area of the memory 32. Therefore, the sub-core 52 receives the stop command as the second switching command and stops executing the angle synchronization control, and the top/bottom task 46 can execute the PWM control by executing the control processing next.

As described above, when the DMA timer setting process is executed in S700 in the top/bottom task 46, the process proceeds to S800 to execute the end operation mode acquisition process. This end operation mode acquisition process is executed in the same manner as the start operation mode acquisition process in S500 in accordance with the procedure shown in FIG. 12.

When the end operation mode acquisition process is executed in S800, the top/bottom task 46 finally executes the SR resetting process in S900 and executes the control process.

The SR resetting process is a process for performing the PWM control or the angle synchronization control properly at the next time according to the operation mode after changing when the end operation mode set in the end operation mode acquisition process is changed from the start operation mode.

Figure 15:
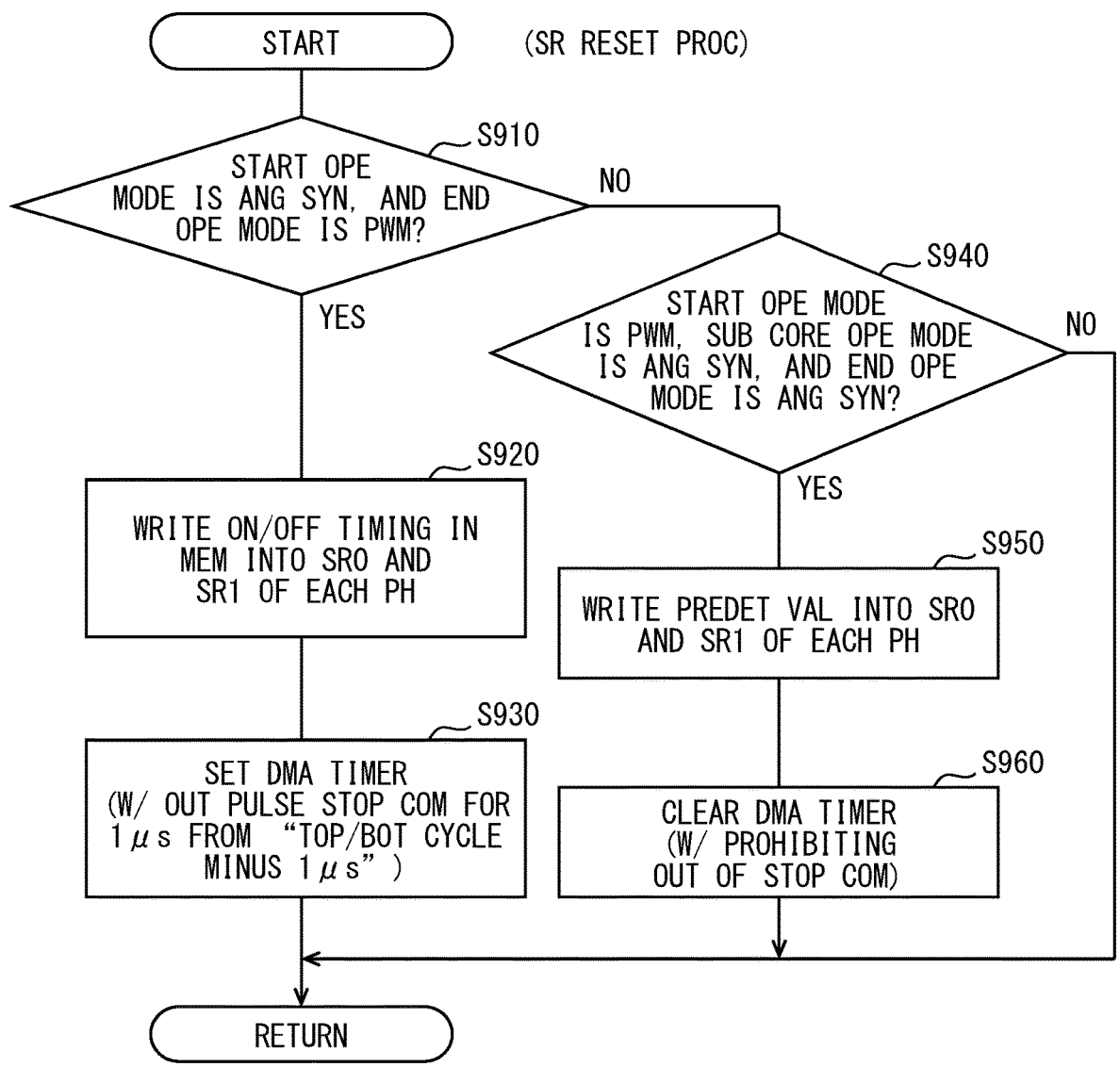
FIG. 15 is a flowchart showing a SR resetting processing executed in S900 of FIG. 10.

As shown in FIG. 15, in the SR resetting process, first, in S910, it is determined whether or not the operation mode at the start is the angle synchronization mode and the operation mode at the end is the PWM mode. Then, when it is determined in S910 that the operation mode at the start is the angle synchronization mode and the operation mode at the end is the PWM mode, the process proceeds to S920.

In S920, when the duty setting process for PWM of each phase is executed, the ON/OFF timing for PWM control stored in the memory 32 in the process of S630 illustrated in FIG. 13 is read out, and is written to the shadow registers SR0, SR1 of each phase.

Then, in subsequent S930, the DMA timer 69 is set so that a stop command is output immediately before the top/bottom task 46 next starts its operation, and the SR resetting process ends in the same procedure as in the process of S730 in FIG. 14.

As a result, when the operation mode is changed from the angle synchronization mode to the PWM mode during operation of the top/bottom task 46, the operation mode of the sub-core 52 can be switched to the PWM mode immediately before starting the top/bottom task 46 next time.

Further, when the top/bottom task 46 starts the control process next time, the ON/OFF timing for PWM control is written in advance in the shadow registers SR0 and SR1 of each phase by the process of S920. Thus, the PWM control can be started properly.

Next, when it is determined in S910 that the operation mode at the start is not the angle synchronization mode or the operation mode at the end is not the PWM mode, the process proceeds to S940. In S940, it is determined whether or not the operation mode at the start is the PWM mode, the sub-core operation mode is the angle synchronization mode, and the operation mode at the end is the angle synchronization mode.

When it is determined in S940 that the operation mode at the start is the PWM mode, the sub-core operation mode is the angle synchronization mode, and the operation mode at the end is the angle synchronization mode, the process proceeds to S950, and, unless such determination is made in S940, the SR resetting process is terminated.

At S950, the above predetermined values are written in the shadow registers SR0 and SR1 of each phase. In the following S960, the DMA timer 69 is cleared to prohibit the output of the stop command by the operation of the DMAC 34, and the SR resetting process ends.

Therefore, when the operation mode at the start is the PWM mode, the operation mode of the sub-core 52 is the angle synchronization mode, and the operation mode of the top/bottom task 46 changes to the angle synchronization mode, the angle synchronization control by the sub-core 52 can be quickly started.

Further, when the sub-core 52 starts the angle synchronization control in this way, in S950, since the predetermined values are written in the shadow registers SR0 and SR1 of each phase, it is restricted the compare registers CM0 and CM1 of each phase from being written to the PWM control. Therefore, the angle synchronization control by the sub-core 52 can be performed appropriately.

[Effects]

As described above, in the control device 30 of the present embodiment, the top/bottom task 46 switches the operation mode of the sub-core 52, and, when starting the angle synchronization control by switching the operation mode, the sub-core 52 writes the predetermined values to the shadow registers SR0 and SR1. Therefore, according to the control device 30 of the present embodiment, it is possible to prevent the angle synchronization control and the PWM control from interfering with each other.

In addition, when the operation mode at the end of control has changed from the operation mode at the start of control, the top/bottom task 46 resets the predetermined values or the on/off timing for the PWM control in the shadow registers SR0 and SR1 of each phase in the SR resetting process.

Therefore, the top/bottom task 46 or the sub-core 52 can quickly start the PWM control or the angle synchronization control according to the operation mode when the top/bottom task 46 ends the control, and furthermore, when the control starts, mutual interference therebetween can be suppressed.

Therefore, according to the control device 30 of the present embodiment, using one timer circuit provided in a general microcomputer, not only the angle synchronization control and the PWM control are selectively performed, but also the instability of motor control due to interference between these controls can be suppressed.

In particular, since the control device 30 of the present embodiment controls the motor 10, which is the vehicle's main engine, it is possible to suppress overcurrent flowing through the motor and torque fluctuations to realize safe vehicle running. Moreover, the manufacturing cost of the control device 30 can be reduced.

(Other Embodiments)

Although the embodiments of the present disclosure have been described above, the present disclosure is not limited to the embodiments described above, and various modifications can be made to implement the present disclosure.

For example, in the above-described embodiment, the control method is described as switching between four stages as shown in FIG. 3. This feature is merely an example. Any control device that switches between the angle synchronization control and the PWM control can be applied to the technique of the present embodiments.

Further, in the above embodiment, each function of the control device 30 has been described as being realized by control processing executed by the CPU 40 or the sub-core 52, in other words, execution of a program. Alternatively, some of the functions in the control device 30 may be realized by hardware logic circuits.

Multiple functions belonging to one configuration element in the above-described embodiment may be implemented by multiple configuration elements, or one function belonging to one configuration element may be implemented by multiple configuration elements. Multiple functions belonging to multiple configuration elements may be implemented by one configuration element, or one function implemented by multiple configuration elements may be implemented by one configuration element. A part of the configuration of the above embodiment may be omitted. At least a part of the configuration of the above embodiment may be added to or substituted for the configuration of the other embodiment.

In addition to the motor control device, the present embodiments can be also be realized in various configurations such as a control system, a program for causing a computer to function as a motor control device, a non-transitory tangible storage medium such as a semiconductor memory for storing this program, a motor control method, and the like.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A motor control device for driving a motor by operating an inverter having a plurality of switching elements that connect a positive electrode and a negative electrode of a DC power supply and a plurality of terminals of the motor, the motor control device comprising:

a timer circuit that includes: a plurality of compare registers for storing an on and off timing of each switching element for each pair of a positive side switching element and a negative side switching element respectively connected to the plurality of terminals of the motor in the inverter; and a counter for clocking, and is configured to output a signal representing the on and off timing of each switching element when a value of each of the compare registers matches a value of the counter;

a control mode setting unit configured to set a control mode of the motor to be one of a PWM mode for turning on and off each switching element at a predetermined timing at regular time intervals and an angle synchronization mode for turning on and off each switching element according to a rotation angle of the motor, based on a command torque input from an external device;

a PWM control unit configured to perform, at regular time intervals, a PWM control for calculating the on and off timing to be set to each compare register for driving the motor with the command torque and outputting the on and off timing to the timer circuit when the control mode set by the control mode setting unit is the PWM mode;

an angle calculation unit configured to calculate, as a rotation angle of the motor, the on and off timing of each switching element for driving the motor with the command torque at every predetermined rotation angle of the motor; and an angle synchronization control unit configured to execute an angle synchronization control for writing the on and off timing to each compare register to turn on and off each switching element at the rotation angle calculated by the angle calculation unit, wherein:

the timer circuit includes a plurality of data registers that store a plurality of on and off timings output from the PWM control unit to each of the compare registers;

the timer circuit is configured to write the on and off timings stored in the plurality of data registers to the compare registers respectively at the regular time intervals;

the angle synchronization control unit switches an operation mode of the angle synchronization control unit as a first operation mode to the angle synchronization mode to start the angle synchronization control when the motor reaches a predetermined rotation angle position next time after receiving a first switching command in a case where the first operation mode is the PWM mode;

the angle synchronization control unit switches the first operation mode to the PWM mode to stop the angle synchronization control when receiving a second switching command in a case where the first operation mode is the angle synchronization mode;

the PWM control unit outputs the first switching command to the angle synchronization control unit to continue the PWM control when the control mode acquired from the control mode setting unit is the angle synchronization mode until the first operation mode of the angle synchronization control unit is switched from the PWM mode to the angle synchronization mode;

the PWM control unit outputs the second switching command to the angle synchronization control unit to switch the first operation mode of the angle synchronization control unit to the PWM control immediately before starting a next PWM control after the regular time interval has elapsed in a case where the control mode acquired from the control mode setting unit is the PWM mode, and the first operation mode of the angle synchronization control unit is the angle synchronization mode; and the angle synchronization control unit: sets the first operation mode to the angle synchronization mode according to the first switching command output from the PWM control unit; writes a predetermined value not matching the value of the counter; and then, starts the angle synchronization control.

2. The motor control device according to claim 1, wherein:

the PWM control unit:

obtains the control mode from the control mode setting unit and compares the control mode with the first operation mode of the angle synchronization control unit at each of a start and an end of an operation at the regular time intervals, respectively;

sets the operation mode of the PWM control unit as a second operation mode to the angle synchronization mode when both the control mode and the first operation mode are the angle synchronization mode;

sets the second operation mode to the PWM mode when at least one of the control mode and the first operation mode is the PWM mode;

stores the on and off timings written in the data registers of the timer circuit, respectively, by the PWM control as resetting data;

writes the resetting data in each of the data registers when the second operation mode set at the start of the operation is the angle synchronization mode and the second operation mode set at the end of the operation is the PWM mode, and outputs the second switching command to the angle synchronization control unit immediately before starting the operation after the regular time interval; and writes the predetermined value in each of the data registers of the timer circuit when the second operation mode set at the start of the operation is the PWM mode, the first operation mode of the angle synchronization control unit is the angle synchronization mode, and the second operation mode set at the end of the operation is the PWM mode.

3. The motor control device according to claim 1, wherein:

the PWM control unit sets a timing for outputting the second switching command to the angle synchronization control unit in the timer circuit, and outputs the second switching command to the angle synchronization control unit from the timer circuit at a set timing.

4. The motor control device according to claim 1, wherein:

the motor control device is configured by a microcomputer including the timer circuit, and the angle synchronization control unit is configured by a core different from a CPU core functioning as the PWM control unit.

* * * * *